United States Patent
Sundar et al.

(10) Patent No.: US 7,389,342 B2
(45) Date of Patent: Jun. 17, 2008

(54) SERVICE CREATOR APPARATUS, SYSTEMS, AND METHODS

(75) Inventors: Murali Sundar, Portland, OR (US); Arvind Kumar, Beaverton, OR (US); Alok Prakash, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1051 days.

(21) Appl. No.: 10/210,199

(22) Filed: Jul. 31, 2002

(65) Prior Publication Data

US 2004/0024866 A1    Feb. 5, 2004

(51) Int. Cl.
*G06F 15/173* (2006.01)
(52) U.S. Cl. ...................... 709/224; 719/328
(58) Field of Classification Search ........ 709/223–224, 709/238; 719/328; 707/10; 717/140
See application file for complete search history.

(56) References Cited

U.S. PATENT DOCUMENTS

| | | | |
|---|---|---|---|
| 6,055,570 A | | 4/2000 | Nielsen |
| 6,081,840 A | | 6/2000 | Zhao |
| 6,337,899 B1 | | 1/2002 | Alcendor et al. |
| 6,738,975 B1 | * | 5/2004 | Yee et al. ................. 719/310 |
| 2003/0018832 A1 | * | 1/2003 | Amirisetty et al. ......... 709/328 |
| 2003/0088659 A1 | * | 5/2003 | Susarla et al. ............. 709/223 |
| 2003/0101251 A1 | * | 5/2003 | Low .......................... 709/223 |
| 2004/0015898 A1 | * | 1/2004 | Tewksbary ................. 717/140 |
| 2004/0049589 A1 | | 3/2004 | Papanikolaou et al. |
| 2004/0128297 A1 | * | 7/2004 | Moses et al. ............... 707/100 |
| 2005/0172018 A1 | * | 8/2005 | Devine et al. .............. 709/223 |

OTHER PUBLICATIONS

"Java™ Look and Feel Design Guidelines: Advanced Topics", Sun Microsystems, Inc, (May 27, 2001), 7 pgs.
Harris, A., "Microsoft®C# Programming for the Absolute Beginner", (May 2, 2002), 10 pgs.
Hunter, J., "Java Servlet Programming", (Nov. 1998), 4 pgs.
"U.S. Appl. No. 10/194,626, Advisory Action mailed May 16, 2006", 3 pgs.
"U.S. Appl. No. 10/194,626, Appeal Brief filed Jan. 19, 2007", 23 pgs.
"U.S. Appl. No. 10/194,626, Appellant's Reply Brief filed Jul. 2, 2007", 7 pgs.
"U.S. Appl. No. 10/194,626, Examiner's Answer mailed Apr. 30, 2007", 18 pgs.
"U.S. Appl. No. 10/194,626, Notice of Appeal and Pre-Appeal Brief Request for Review filed", 8 pgs.

(Continued)

*Primary Examiner*—Abdullahi Salad
(74) *Attorney, Agent, or Firm*—Schwegman, Lundberg & Woessner, P.A.

(57) ABSTRACT

A service creation apparatus may include an adapter communicatively coupled to a provider module by way of a uniform interface. The adapter may also be coupled to a tool via the tool's native interface. A system may include a processor coupled to a memory including the apparatus. A method for creating a service may include selecting a plurality of features provided by a native interface of a tool, collecting the plurality of features from the native interface to form a service having a uniform interface, and providing the service to a plurality of users using the uniform interface.

22 Claims, 3 Drawing Sheets

OTHER PUBLICATIONS

"U.S. Appl. No. 10/194,626, Notice of Panel Decision from Pre-Appeal Brief Review mailed Dec. 21, 2006", 2 pgs.

"U.S. Appl. No. 10/194,626, Preliminary Amendment filed Jul. 30, 2004", 5 pgs.

"U.S. Appl. No. 10/194,626, Final Office Action mailed Mar. 1, 2006", 15 pgs.

"U.S. Appl. No. 10/194,626, Non-Final Office Action mailed Oct. 17, 2005", 13 pgs.

"U.S. Appl. No. 10/194,626, Response filed Dec. 8, 2005 Non-Final Office Action mailed Oct. 17, 2005", 10 pgs.

"U.S. Appl. No. 10/194,626, Response filed May 1, 2006 Final Office Action mailed Mar. 1, 2006", 11 pgs.

* cited by examiner

SERVICE CREATOR APPARATUS, SYSTEMS, AND METHODS

RELATED APPLICATIONS

This application is related to co-pending application Ser. No. 10/194,626, titled "Managed Service Apparatus, Systems, and Methods", filed on Jul. 11, 2002 and commonly assigned to the assignee of the present invention.

TECHNICAL FIELD

Embodiments of the invention relate generally to apparatus, systems, and methods used for data processing and computer user interface management. More particularly, embodiments of the invention relate to providing a variety of users with access to a managed service created by adapting programs traditionally operated as an internal data processing activity.

BACKGROUND INFORMATION

Traditional data center operations tools, such as backup, security, and network monitoring, are typically implemented on an infrastructure-centric basis. Such tools have been devised, often at great expense, to provide one or more services within a particular operational entity. Thus, there is no concept associated with these services of a "customer" as such, but merely the use of one or more services available within the entity, such as a data processing center.

With increased access to information by small to medium-sized businesses via wide area networks, a marketing niche has arisen: the provision of computational and information management services to businesses unable to afford custom application development, either with respect to time or money. While some service providers have come to the market with newly-developed, multi-customer and network-enabled software to provide such services, there are many others that wish to offer these services using legacy tools, originally developed in-house for use by a single entity, on a networked, multi-customer basis. Such tools have a history of operating on a daily basis in a real-world environment, providing the additional benefit of proven performance.

In selling services to consumers, the ability to offer a product which is competitively priced, free from operational inconsistency, and readily available on a semi-custom basis is important. However, attempting to deploy legacy tools in the form of newly-developed, customized versions for a variety of individual customers over a network is expensive, time-consuming, and fraught with many of the problems inherent in any programming development effort.

In addition, some legacy tools, while operating at a suitable level within a particular entity, may not be capable of meeting consumer expectations associated with most basic service offerings, such as the generic ability to accommodate usage preferences of multiple customers (and users which make up a single customer), to gather usage statistics, to provide customer-specific control, health, and status reports, as well as to provide operational problem alerting.

Another difficulty in converting such tools for use by a variety of customers is creating a customer-centric operational view, such that the application interface is consistent across multiple customers and, possibly, across multiple service offerings. Each tool typically has distinct interface requirements. Further, while many users share operational and logistical characteristics, so as to be somewhat the same, there are also unique needs which must be addressed, such as requirements for operational problem alerting, service billing, and reporting.

DETAILED DESCRIPTION OF EMBODIMENTS OF THE INVENTION

Figure 1:
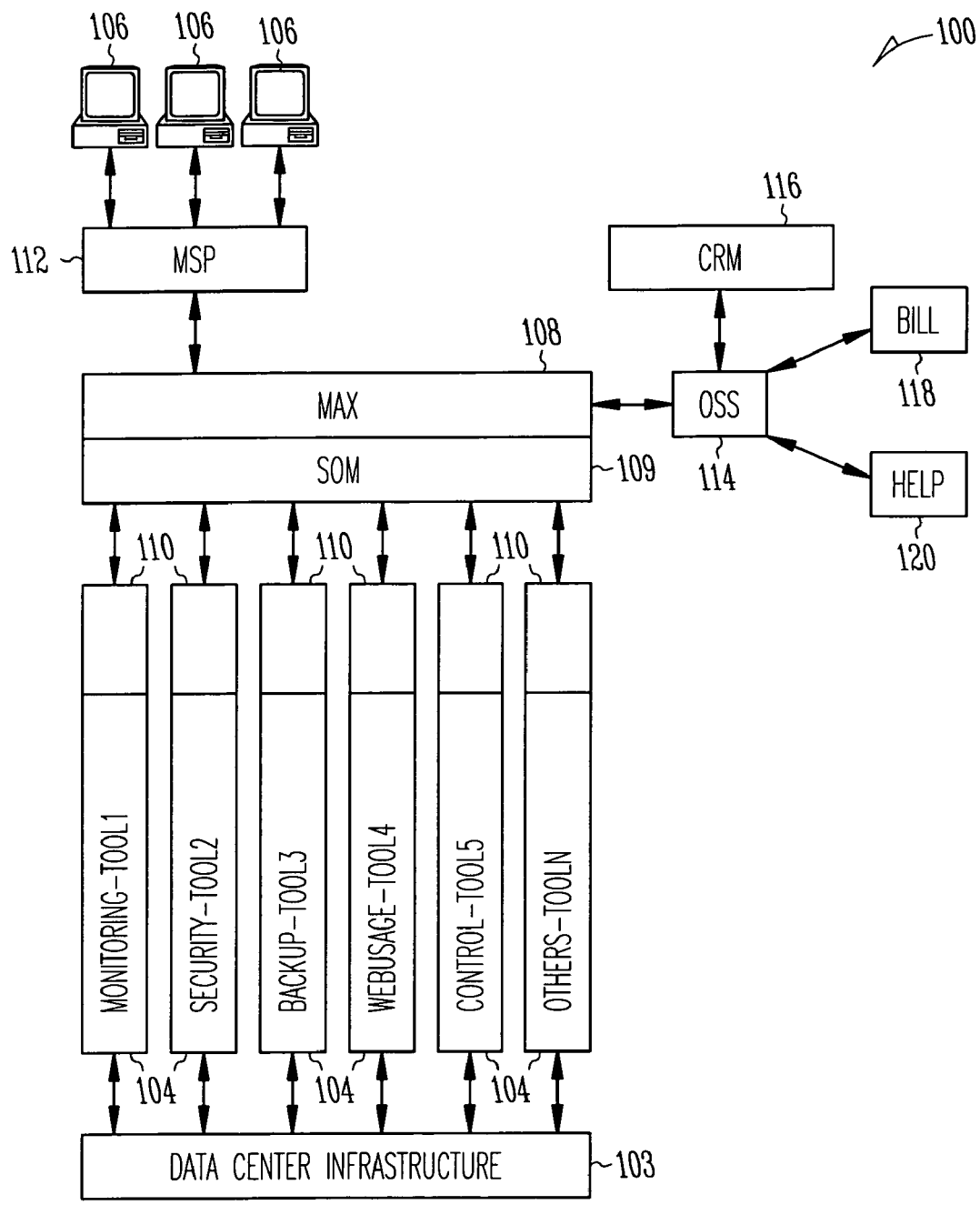
FIG. 1 is a functional block diagram of a data center structured to offer services created according to an embodiment of the present invention.

In the following detailed description of various embodiments of the invention, reference is made to the accompanying drawings which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments of the invention is defined only by the appended claims, along with the full range of equivalents to which such claims are entitled.

FIG. 1 is a functional block diagram of a data center 100 structured to offer services created according to an embodiment of the present invention Thus, FIG. 1 provides an overview of how an apparatus and article according to various embodiments of the invention might fit into the overall operation of the data center 100. The data center infrastructure module 103 represents a collection of the existing data center operations tools as they are typically deployed in data centers. The infrastructure 103 thus can include systems, applications, networking equipment, system and network management software, backup solutions, security infrastructure, etc. The infrastructure 103 may also include various services or tools 104, such as monitoring, security, backup, web usage, control, and others, such as problem resolution, which a service provider might wish to provide to its customers 106.

The Multiple Association (MAX) engine 108 manages the multiple-customer interface between the services 104 and the customers 106, using a Services Object Manager (SOM) 109, one or more service creation apparatus 110, a Managed Services Portal (MSP) 112, and one or more Operations Support System (OSS) 114 applications interfaces. The MSP 112 operates to expose services to a particular customer 106, or its agent. Alternatively, directly-served customers 106 may include Hosting Service Providers (HSPs), Management Service Providers, Internet Service Providers (ISPs), and Application Service Providers (ASPs) operating as "channel partners" in order to provide each of their own customers with a full-service solution, albeit indirectly. In any event, the modules 108, 110, 112, and 114 operate together to provide features expected by the consuming public with respect to customized data center service offerings, such as Customer Resource Management (CRM) 116, billing 118 and help desk 120 access. Of course, such features are merely examples of the many business support systems that a service provider might require to conduct operations.

For example, backing up software and data has come to be an essential part of prudent computer operational procedures, especially in the business context. Such activity may be provided by an HSP, which has a data center and an operations center offering web-site hosting services, as another service. In this case, customers should be able to go to the HSP web-site, view the available services for each server the customer operates, and request provision of the backup service. Various embodiments of the invention enable the HSP to purchase an off-the-shelf backup application, partition the features of the application, and expose them as individual services to which the customer can subscribe. Such applications are not typically offered as a service to multiple users, but they are designed for one large company to manage its needs. Thus, some embodiments of the invention may enable the provision of partitioned file and server mapping, monitoring backup operations, service billing, status reporting, and (scheduled) automatic initiation of the service. In this manner, an enterprise backup tool can be delivered as a tailored service package to many customers.

Figure 2:
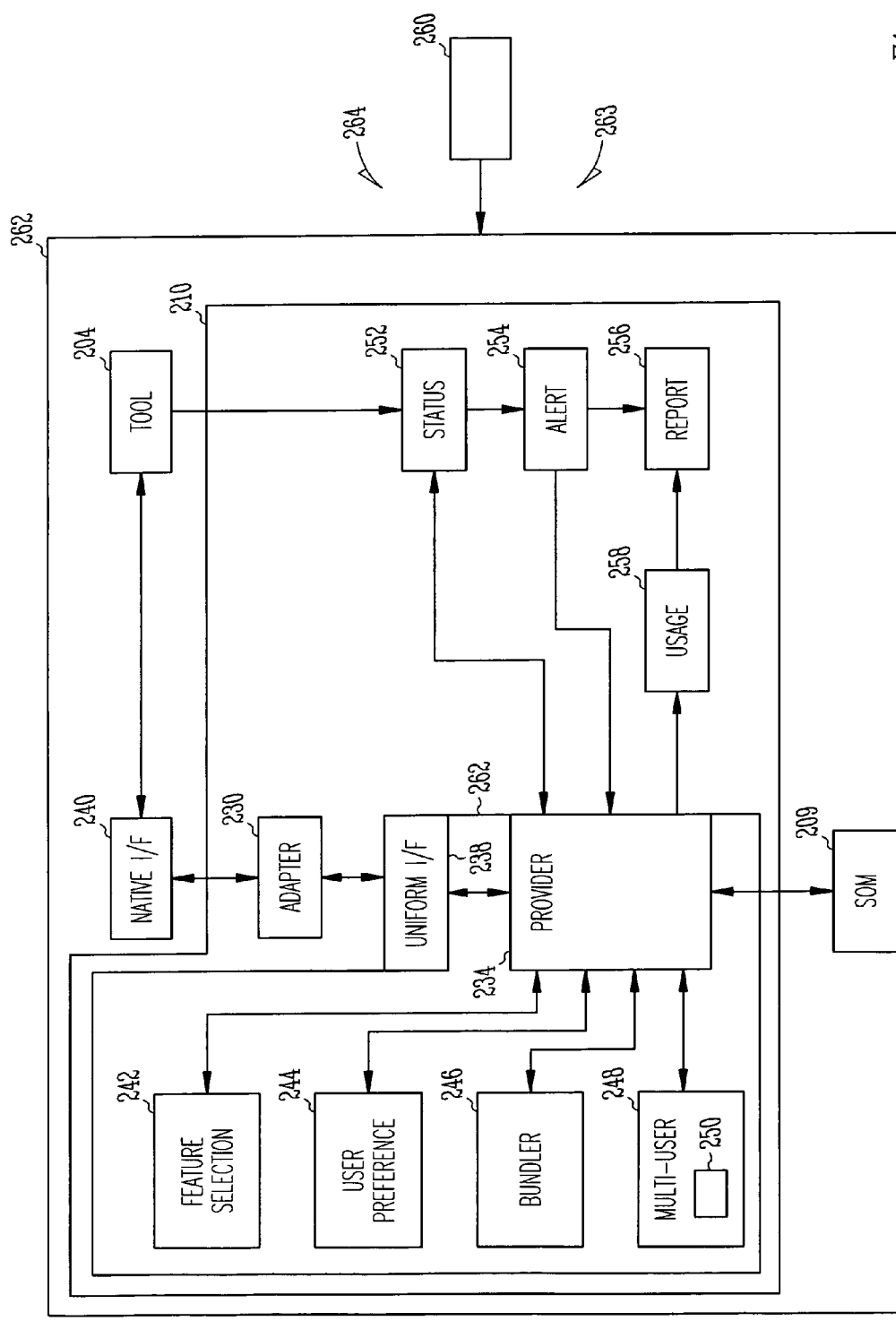
FIG. 2 is a functional block diagram of an apparatus, an article, and a system according to various embodiments of the present invention.

FIG. 2 is a functional block diagram of an apparatus, an article, and a system according to various embodiments of the present invention. In one embodiment, the service creation apparatus 210 may include an adapter module 230 communicatively coupled to a provider module 234 using a uniform interface 238. Each tool 204 may be communicatively coupled by way of its native interface 240 to the adapter module 230 specifically constructed for that tool 204. Each adapter module 230 operates to extract or use one or more features of its respective tool 204 in the form of predefined abstractions, such as a "service element", a "report element", and an "alarm element." Each adapter module 230 may be network-enabled, and it may have the capability to transform user requests into tool-specific commands and formatted data fields, as needed. For example, if a particular tool requires file names that are exactly ten characters long, then the adapter module 230 can change all file action requests to match this requirement. Thus, as shown in FIGS. 1 and 2, there can be many services offered to various users using tools 104, 204, communicatively coupled via their particular native interfaces 240 and adapter modules 230 to the uniform interface 238.

The provider module 234 takes the predefined abstractions of the tools 204 and presents them as services that can be subscribed, monitored, billed, etc. The provider module 234 also is able to handle the requests of multiple users with respect to the provision of services. Thus, for example, if a particular tool has no way of dealing with multiple users, the provider module 234 may read some code out of a cache and send the code as an object identifier such that the tool never needs to acknowledge that the request is made on behalf of a specific user.

An example of the interaction between the tool 204, the adapter module 230, and the provider module 234 may be useful to better understanding the apparatus of some embodiments of the invention. Assume that a tool 204 comprises a single-user file system, such as that which exists on a laptop computer. In the prior art, separate directories would be set up for use by separate users, X, Y, and Z. Each user would be instructed to use only its respective directory, and the users would be forbidden to access each other's directories. Such a system would be functional, at least until one of the users forgot to implement the voluntary separation of directories.

As an alternative, using an embodiment of the invention, an adapter module 230 may be used to expose an applications interface (API) having file management operations such as "list," "put," "get," etc. The API might be configured to accept the name of a user X, Y, or Z as a parameter to be used in conjunction with the operation request, such that the provider module 234 may accept file operation requests from individual users and provide the request, along with the user name (e.g., [Y, get]), to the adapter module 230. The adapter module 230, in turn, may map the user name to a particular, selected directory (e.g., directory "Y"), and maintain separation between the users X, Y, and Z in an automated, enforceable, and predictable fashion.

Using this same example, therefore, it is easily understood that the adaptor module 230 transforms the tool 204 into something that can provide file management services for multiple users. The provider module 234 may then be able to enforce various limits or policies imposed on individual activity, such as, for example, limiting each user to storing only ten files in a repository.

The SOM 209 is a module which tracks the operations of other modules, and their relationships. Each module may be represented by an object in the SOM 209. For the purposes of this document, an "object" may be defined as a logical entity that represents the modules constituting a service to a customer. Examples of some of the base objects include, but are not limited to, customers, services, reports, alerts, alert response procedures, and service level agreements. Such objects can be further specified and divided into different classes or types. For example, a service may be a backup service, a system monitoring service, an application monitoring service, a remote control service, and so forth. Association objects may be used to represent the relationships among various collections of objects.

The data model, behavior, and relationships between objects may be defined using human and computer-readable "schema". Thus, the schema may constitute the definition of the object model, while objects themselves may be the instantiation of the schema constructs.

Items that may be tracked by the SOM 209 include customer identity and customer-specific information, service catalogs, subscribed services, service parameters, customer-service resource mapping, alert response procedures, service level agreements, customer documents, etc. All of this information is represented using one or more schema which can be instantiated into live objects. The SOM 209 maintains the relationship between the instantiated objects and, once instantiated, the SOM 209 can expose the live objects to other modules.

Features selected by the service creation apparatus 210 or by users may be grouped into a service using the feature selection module 242, communicatively coupled to or included in the provider module 234. Individual user preferences may be applied to each service by way of the user preference module 244, also communicatively coupled to or included in the provider module 234, which collects, tracks, and stores individual user preferences, and which activates them for the service currently provided.

A service bundler module 246, communicatively coupled to or included in the provider module 246, may be used to bundle a group of services together to form a service offering for one or more users. A multi-user enabling module 248, communicatively coupled to or included in the provider module 234, may include a user-specific control module 250 that allows each user to independently control the service provided to it.

Typically, many thousands of operations occur simultaneously within the apparatus 210. While some events are published, many are not, and some way to sample the state of the apparatus 210 periodically is often necessary. Thus, the tool 204, adapter 230, and provider module 234 may all be communicatively coupled to and monitored by the status module 252, which may be used to set up periodic status sampling regarding operations conducted within the apparatus 210, including maintenance of an event polling schedule and distribution of selected activities over various time intervals, if desired.

The status module 252 may be communicatively coupled to and provide status information to an alert module 254 and/or a report module 256. If certain conditions are met, the status module 252 may activate the alert module 254, which may operate to provide alert information to the provider module 234, and to the report module 256.

The provider module 234 may provide usage information and statistics to a usage monitor 258, which is in turn provided to the report module 256. Thus, the report module 256 may also be communicatively coupled to the provider module 234 and to the usage monitor 258. The usage information, along with information about alerts and status, can be provided to users as an aid for monitoring service usage, and for locating trouble spots, using reports generated by the report module 256. Processor 260, memory 262, and system 263 will be described below, following the detailed description of FIG. 3.

One or more adapters 230 may interface with one or more tools 204 using their native interfaces 240, such as a programmatic applications interface (e.g., Microsoft® Windows®-compatible Applications Program Interfaces (APIs-),,.NET (Microsoft®.NET Framework, Version SP1, 2002) APIs, COM (Component Object Model Specification, Version 0.9, 1995) APIs, Windows® Performance Monitor APIs, WMI (Windows® Management Instrumentation, Version 1.5, 2000) APIs, MOM (Microsoft® Operations Manager, Version 1.0, 2001) APIs, Windows®/Unix Device Driver APIs, etc.), a remote procedure call, a message bus, a web services interface (e.g., XML (Extensible Markup Language 1.0, October 2000), SOAP (Simple Object Access Protocol, Version 1.2, December 2001), and various Java web services), system management protocols (e.g. SNMP (Simple Network Management Protocol, Version 3, 2001), CIM (Common Information Model, Version 2.2, 1999), DMI (Desktop Management Interface, Version 2.0, 1996), etc.), sockets, or gathering data from databases, directories, and files. The adapters 230 may make queries in real time to provide the most up-to-date data available from the tools 204, as needed.

With respect to FIGS. 1 and 2, it should be noted that the tools 104/204, MAX 108, SOM 109/209, apparatus 110/210, the MSP 112, the OSS 114, the CRM 116, the billing and help desk 118 and 120, respectively, the adapter 230, the provider module 234, the interfaces 238 and 240, the feature selection module 242, the user preference module 244, the service bundler module 246, the multi-user module 248, the status module 252, the alert module 254, and the report module 256 may all be characterized as "modules" herein. Such modules may include, or communicate with, hardware circuitry, such as one or more processors and/or memory circuits, software program instructions, firmware, and/or combinations thereof, as desired by the architect of the apparatus 110/210, and as appropriate for particular implementations of various embodiments of the invention. All of the modules may reside in a single memory or computer, or each module may be distributed among multiple processors and/or computers, or some combination of concentration and distribution may be effected, so as to group various modules in selected locations, again, as may be appropriate for particular implementations of various embodiments of the invention.

One of ordinary skill in the art will understand that the service creation apparatus described herein can be used in applications other than with systems that include networked servers or devices, and thus various embodiments of the invention are not to be so limited. The illustrations of a service creation apparatus 110/210 are intended to provide a general understanding of the structure of various embodiments of the present invention, and they are not intended to serve as a complete description of all the elements and features of service management apparatus and systems that might make use of the structures described herein.

Applications which may include the novel service creation apparatus described herein include electronic circuitry used in high-speed computers, communications and signal processing circuitry, processor modules, embedded processors, and application-specific modules, including multilayer, multi-chip modules. Such service management apparatus and systems may further be included as sub-components within a variety of electronic systems, such as televisions, cellular telephones, personal computers, radios, vehicles, and others.

Figure 3:
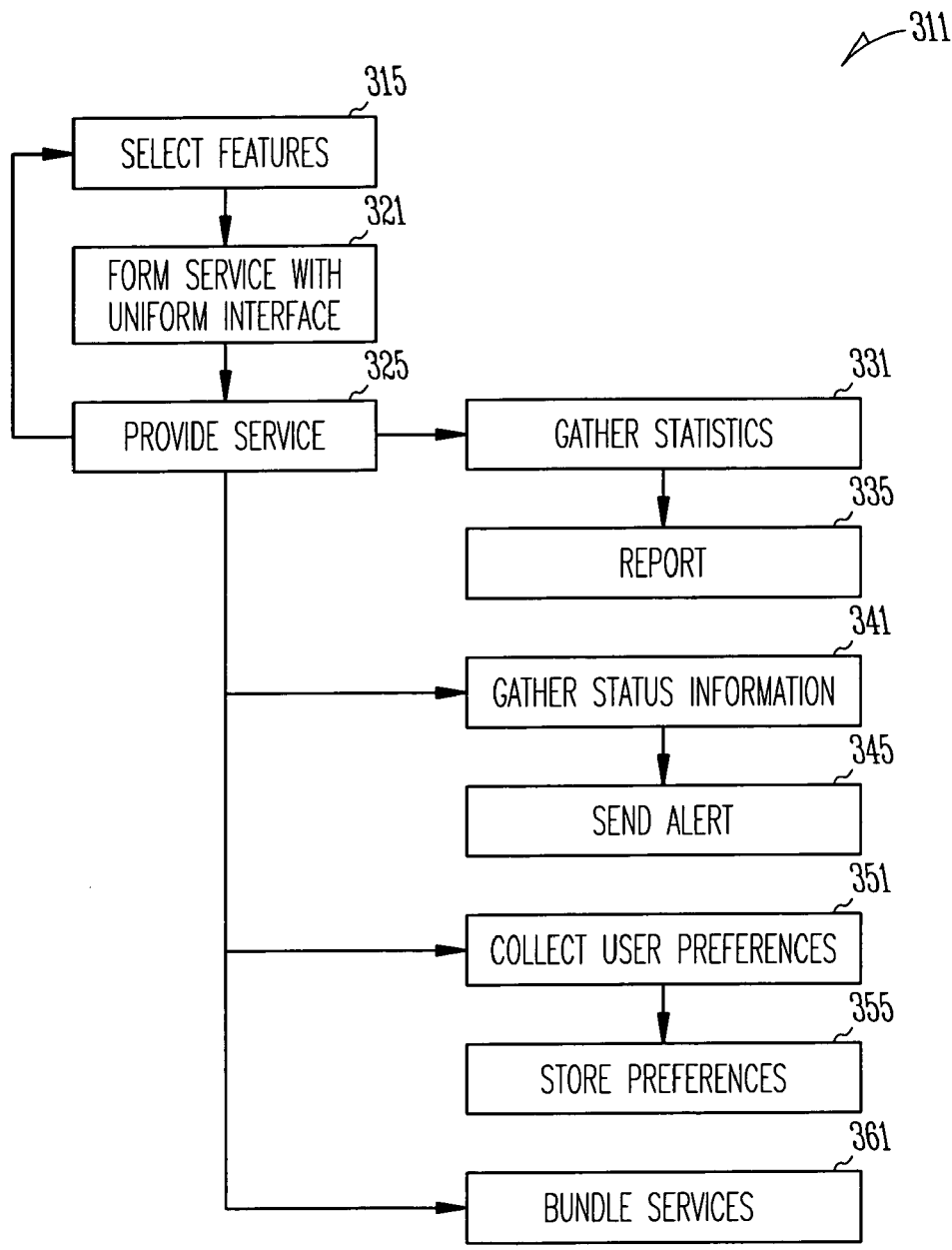
FIG. 3 is a flow diagram of a method of creating a service according to an embodiment of the present invention.

FIG. 3 is a flow diagram of a method for creating a service according to an embodiment of the present invention. The method 311 may include selecting a plurality of features provided by a native interface of a tool at block 315, collecting the plurality of features from the native interface to form a service having a uniform interface at block 321, and providing the service to a plurality of users using the uniform interface at block 325. As noted above, the uniform interface may include one or more features of each tool in the form of predefined abstractions.

Each service provided to a plurality of users by way of the uniform interface may include any number of features selected by the apparatus described herein or by its users, such as, for example, gathering a plurality of usage statistics associated with the service and one or more users at block 331, and reporting selected usage statistics associated with the service to selected users at block 335. Providing such services may also include gathering status information associated with one or more services at block 341, and sending an alert message associated with the status information to selected users at block 345. Another example of providing such services includes collecting a plurality of preferences associated with selected users at block 351, and storing the preferences at block 355. Provision of such services may even include bundling a selected group of services, each having its own set of selected features, into a service offering for one or more selected users at block 361.

It should be noted that while schema and objects have been used as exemplary representational mechanisms herein, other representational mechanisms may also be used according to the apparatus and methods disclosed herein, and therefore various embodiments of the invention are not to be so limited. Therefore, it should be clear that some embodiments of the present invention may also be described in the context of computer-executable instructions, such as program modules, being executed by a computer. Generally, program modules may include routines, programs, objects, components, data structures, etc. that perform particular tasks or implement particular abstract data types. As such, any of the modules 104, 109, 110, 112, 114, 116, 118, 120, 204, 209, 210, 230, 234, 238, 240, 242, 244, 246, 248, 252, 254, and 256 described herein may include software operative on one or more processors to perform methods according to the teachings of various embodiments of the present invention.

One of ordinary skill in the art will understand, upon reading and comprehending this disclosure, the manner in which a software program can be launched from a computer readable medium in a computer-based system to execute the functions defined in the software program. One of ordinary skill in the art will further understand the various programming languages that may be employed to create one or more software programs designed to implement and perform the methods disclosed herein. The programs can be structured in an object-orientated format using an object-oriented language such as Java, Smalltalk, or C++. Alternatively, the programs can be structured in a procedure-orientated format using a procedural language, such as COBOL or C. The software components may communicate using any of a number of mechanisms that are well-known to those skilled in the art, such as application program interfaces (API) or interprocess communication techniques such as the Remote Procedure Call (RPC). However, as will be appreciated by one of ordinary skill in the art upon reading this disclosure, the teachings of various embodiments of the present invention are not limited to any particular programming language or environment, including Hypertext Markup Language (HTML) and Extensible Markup Language (XML).

As is evident from the preceding description, and referring back to FIG. 2, it can be seen that during the operation of the service creation apparatus 210, a processor 260 may access some form of computer-readable media, such as memory 262. Thus, a system 263 according to an embodiment of the invention may include a processor 260 coupled to a memory 262, volatile (e.g., a disk drive) or nonvolatile (e.g., a flash memory), that includes a provider module 234 coupled to an adapter 230. The memory 262 may also include a uniform interface 238 coupled between the provider module 234 and the adapter 230. In addition, the system 263 may include a status module 252, an alert module 254, and a report module 256, each coupled to the provider module 234.

By way of example and not limitation, computer-readable media may comprise computer storage media and communications media. Computer storage media includes volatile and non-volatile, removable and non-removable media implemented in any method or technology for storage of information such as computer-readable instructions, data structures, program modules or other data. Communications media specifically embodies computer-readable instructions, data structures, program modules or other data in a modulated data signal such as a carrier wave, coded information signal, and/or other transport mechanism, which includes any information delivery media. The term "modulated data signal" means a signal that has one or more of its characteristics set or changed in such a manner as to encode information in the signal. By way of example and not limitation, communications media also includes wired media such as a wired network or direct-wired connections, and wireless media such as acoustic, optical, radio frequency, infrared and other wireless media. Combinations of any of the above are also included within the scope of computer-readable and/or accessible media.

Thus, it is now easily understood that another embodiment of the invention may include an article 264 comprising a machine-accessible medium or memory 262 having associated data, wherein the data, when accessed, results in a machine (e.g. a computer or processor 260) performing activities such as selecting a first plurality of features provided by a native interface of a first tool, collecting the first plurality of features to form a first service having a uniform interface, and providing the first service to a first plurality of users using the uniform interface. Similarly, the activities may include the formation and provision of a second service, by selecting a second plurality of features provided by a native interface of a second tool, collecting the second plurality of features to form a second service having a uniform interface, and providing the second service to a second plurality of users using the uniform interface. As described above, the uniform interface may include one or more selected features as one or more predefined abstractions. Also, as noted above, such activities may include bundling any number of services formed in this manner into one or more service offerings.

Various embodiments of the invention may be suitable for use over networks, including global telecommunications networks. Such embodiments may accommodate use by multiple-customers, including customer-specific usage preferences, alerting, reporting, and billing. These embodiments may also provide the ability to change single-user tools into multi-user, network-enabled services in a cost-effective manner, with the possibility of adding additional revenue streams for the service provider.

Although specific embodiments have been illustrated and described herein, those of ordinary skill in the art will appreciate that any arrangement which is calculated to achieve the same purpose may be substituted for the specific embodiments shown. This disclosure is intended to cover any and all adaptations or variations of various embodiments of the present invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the following Abstract is provided to comply with 37 C.F.R. §1.72(b) requiring an Abstract that will allow the reader to quickly ascertain the nature of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. An apparatus, comprising:
    an adapter having a plurality of uniform interfaces including at least one predefined abstraction for each one of the plurality of uniform interfaces, the adapter communicatively coupled to a native interface of at least two tools and using at least one feature of the tools in the form of the at least one predefined abstraction; and
    a provider module comprising instructions stored on a computer-readable medium communicatively coupled to the adapter and selectively coupled to the at least one predefined abstraction of the uniform interfaces, the provider module to provide a plurality of services using the uniform interfaces and the at least one predefined abstraction.

2. The apparatus of claim 1, further comprising:
    a status module communicatively coupled to the tools.

3. The apparatus of claim 2, further comprising:
    an alert module communicatively coupled to the status module.

4. The apparatus of claim 1, further comprising:
    a usage monitor communicatively coupled to the provider module.

5. The apparatus of claim 1, further comprising:
    a report module communicatively coupled to the provider module.

6. The apparatus of claim 1, further comprising:
    a user preference module communicatively coupled to the provider module.

7. The apparatus of claim 1, further comprising:
    a feature selection module communicatively coupled to the provider module.

8. The apparatus of claim 1, further comprising:
    a service bundler module communicatively coupled to the provider module.

9. The apparatus of claim 1, further comprising:
    a multi-user enabling module communicatively coupled to the provider module.

10. The apparatus of claim 9, wherein the multi-user enabling module includes a user-specific control module.

11. A system, comprising:
    a processor; and
    a memory coupled to the processor, the memory including an adapter having a plurality of uniform interfaces each including at least one predefined abstraction, the adapter communicatively coupled to a native interface of at least two tools and using at least one feature of the tools in the form of the at least one predefined abstraction, and a provider module communicatively coupled to the adapter and selectively coupled to the uniform interfaces, the provider module to provide a plurality of services using the uniform interfaces and the at least one predefined abstraction.

12. The system of claim 11, further comprising:
    a status module communicatively coupled to the provider module.

13. The system of claim 11, further comprising:
    an alert module communicatively coupled to the provider module.

14. A method, comprising:
    selecting a first plurality of features provided by a native interface of a first tool;
    collecting the first plurality of features from the native interface to form a first service having a first uniform interface including at least one predefined abstraction of the first plurality of features;
    providing the first service using the uniform interface and the at least one predefined abstraction of the first plurality of features;
    selecting a second plurality of features provided by a native interface of a second tool;
    collecting the second plurality of features from the native interface of the second tool to form a second service having a uniform interface including at least one predefined abstraction of the second plurality of features; and
    providing the second service using the second uniform interface and the at least one predefined abstraction of the second plurality of features.

15. The method of claim 14, wherein providing further comprises:
    gathering a plurality of usage statistics associated with the first service and a selected one of a plurality of users.

16. The method of claim 15, further comprising:
    reporting selected ones of the plurality of usage statistics associated with the first service to the selected one of the plurality of users.

17. The method of claim 14, wherein providing further comprises:
    gathering status information associated with the first service.

18. The method of claim 17, further comprising:
    sending an alert message associated with the status information to a selected one of a plurality of users.

19. The method of claim 14, wherein providing further comprises:
    collecting a plurality of preferences associated with a selected one of a plurality of users.

20. The method of claim 19, further comprising:
    storing the plurality of preferences.

21. An article comprising a machine-accessible medium having associated data, wherein the data, when accessed, results in a machine performing:
    selecting a first plurality of features provided by a native interface of a first tool;
    collecting the first plurality of features from the native interface of the first tool to form a first service having a first uniform interface including at least one predefined abstraction of the first plurality of features;
    providing the first service using the first uniform interface and the at least one predefined abstraction of the first plurality of features;
    selecting a second plurality of features provided by a native interface of a second tool;
    collecting the second plurality of features from the native interface of the second tool to form a second service having a uniform interface including at least one predefined abstraction of the second plurality of features; and
    providing the second service using the second uniform interface and the at least one predefined abstraction of the second plurality of features.

22. The article of claim 21, wherein the machine-accessible medium further includes data, which when accessed by the machine, results in the machine performing:
    bundling the first and second services to form a service offering.

* * * * *